United States Patent [19]
Jones et al.

[11] 4,087,562
[45] May 2, 1978

[54] DECAFFEINATION OF GREEN COFFEE

[75] Inventors: Gary Victor Jones, Ramsey, N.J.; Joseph Francis Coogan, III, Millbrook, N.Y.

[73] Assignee: General Foods Corporation, White Plains, N.Y.

[21] Appl. No.: 614,398

[22] Filed: Sep. 18, 1975

[51] Int. Cl.$^2$ .......................... A23F 1/10; A23F 3/02
[52] U.S. Cl. .................................... 426/428; 426/427
[58] Field of Search .................... 260/485 R; 426/428, 426/427

[56] References Cited

U.S. PATENT DOCUMENTS

| | | | |
|---|---|---|---|
| 953,643 | 3/1910 | Seisser | 426/428 |
| 1,629,512 | 5/1927 | Kündig | 426/428 |
| 2,016,634 | 10/1935 | Grethe | 426/428 X |
| 2,309,092 | 1/1943 | Berry et al. | 426/428 X |
| 2,817,588 | 12/1957 | Barch | 426/428 |
| 3,671,263 | 6/1972 | Patel et al. | 426/428 |
| 3,682,648 | 8/1972 | Mitchell et al. | 426/428 |

OTHER PUBLICATIONS

"Coffee Processing Technology", vol. 2, by Sivetz, pub. by Avi Pub. Co., Westport, Conn., 1963, pp. 207-215.

Handbook of Chemistry and Physics, 41st edition, Hodgman, Editor in Chief, pub. by Chemical Rubber Pub. Co., Cleveland, Ohio, 1960, pp. 1228-1229.

*Primary Examiner*—Frank Sever
*Attorney, Agent, or Firm*—Thomas R. Savoie; Bruno P. Struzzi

[57] ABSTRACT

Decaffeination of green coffee is achieved by extracting caffeine from either green coffee beans or an aqueous extract of green coffee beans by means of diethyl succinate.

2 Claims, No Drawings

DECAFFEINATION OF GREEN COFFEE

BACKGROUND OF THE INVENTION

Current commercial decaffeination of coffee is effected by the removal of caffeine from whole, green coffee beans. The beans are moistened and then extracted with a solvent which is relatively specific for caffeine. The solvents employed commercially are either a chlorinated hydrocarbon solvent, such as discussed in U.S. Pat. No. 3,671,263 to Patel et al. or a caffeine-deficient water solution of coffee solubles, such as disclosed in U.S. Pat. No. 2,309,092 to Berry et al. both of which are herein incorporated by reference.

In the decaffeination process of U.S. Pat. No. 2,309,092, which is commonly referred to as the water extraction system (Note: Sivetz, *Coffee Processing Technology*, Vol. 2, p. 208, AVI Publishing Co., Inc., 1963), the caffeine laden water extract, resulting from contact between caffeinecontaining green coffee and the caffeine-deficient water solution, is solvent extracted in order to remove caffeine. Typically these solvents are the same chlorinated hydrocarbons which are employed in the direct solvent extraction processes, exemplified by the aforementioned 3,671,263 patent.

As a result of the presence of organic solvents, such as chlorinated hydrocarbons, in commercial green bean decaffeination processes, the decaffeinated coffee products presently being sold, either roasted and ground or soluble, contain at least trace amounts of residual solvent. Since presence of chlorinated, or other halogenated compounds in food products is becoming the subject of increased governmental regulation, it would be desirable to identify and employ a non-halogenated solvent for the decafeination of coffee.

The main feature of any system of decaffeinating coffee, such as in the decaffeination of whole green coffee beans, is to identify a non-toxic solvent in which caffeine is readily soluble and in which non-caffeine coffee solids are insoluble or poorly soluble and which solvent can be removed from the coffee without deteriorating or materially changing the chemical composition of the bean.

SUMMARY OF THE INVENTION

This invention is directed towards methods for decaffeinating green coffee materials, such as whole or ground green coffee beans, which employ diethyl succinate as an organic non-halogenated solvent for caffeine. Diethyl succinate can be used to either directly remove caffeine from the green coffee material or to remove caffeine from an aqueous extract of green coffee.

Diethyl succinate is useful for extracting caffeine as it is stable to chemical deterioration over the temperature and pH ranges normally employed in decaffeination, is essentially insoluble in water, possesses a non-noxious odor, is, because of its low flamability, much less hazardous than solvents such as ethyl acetate, and is approved (<C.F.R. 121.1164) for use in foods. Diethyl succinate is biodegradable and is metabolized in the human body to succinic acid and ethyl alcohol. The solubility of caffeine in diethyl succinate is equivalent to that in trichloroethylene (1.04 v. 1.0 gms./100 cc.) and diethyl succinate's selectivity for caffeine is considered acceptable.

Preferably decaffeination is carried out as a semi-continuous countercurrent operation in a battery operation such as described in the aforementioned Patel et al. and Berry et al. patents. Typically the overall decaffeination process involves moistening the coffee, extracting caffeine from the coffee, stripping residual solvent from the coffee in the case of a direct solvent extraction system, and from the solvent extracted water extract in the case of a water extraction system, and finally drying and cooling the coffee. These basic steps are all well-known in the decaffeination art.

DESCRIPTION OF THE INVENTION

In the process of this invention, the green coffee is moistened or wetted. This moistening will occur as a pre-wetting step by means of steam and/or water in a direct solvent system, and as an inherent aspect of the initial portion of the water extraction system. The moistened coffee is contacted with a caffeine solvent which may be either diethyl succinate or a caffeine-deficient aqueous extract of green coffee which has been decaffeinated by means of diethyl succinate. Solvent residues in the decaffeinated beans will be kept to a low level by means of stripping (e.g. steam stripping) the solvent-decaffeinated beans or the solvent-decaffeinated water extract. Usually the decaffeinated coffee is then cooled and dried; however, as the green coffee must eventually be roasted, it is possible to eliminate the cooling and/or drying steps and to directly send the decaffeinated coffee to a roaster. The roasted coffee is suitable for use as either regular coffee or for extraction in making soluble coffee.

The moistening operation involves uniformly incorporating water in the green coffee. This water is thought to swell the coffee, solubilize the caffeine and, in general, to render the green coffee caffeine-extractable. Moistening can be accomplished by adding water and mixing the coffee, by using humidified air or other gases, and/or by employing steam. The particular method employed for moistening the bean is not critical, so long as a uniform and relatively even penetration of water is obtained throughout the coffee. Coffee may be moistened to any desired degree, but we have found that the greater the moisture content of the coffee, the more rapid is the caffeine extraction employing a given solvent. Thus, while moisture contents of about 15 to over 50% may be employed, we prefer to extract green coffee having a moisture content greater than 30% water, and preferably greater than 40% water. Generally, when direct organic solvent decaffeination is employed, an initial steaming step will be combined with a pre-wetting step in order to achieve the desired moisture level. Such a procedure is set forth in the aforementioned Patel et al. patent which also notes that all or part of the pre-wetting water can be added simultaneously with the organic solvent. When a water decaffeination system is used, such as that of Berry et al., a separate moistening step is not necessary since the moisture level of the coffee will be raised, as a matter of course, during contact with the aqueous extraction medium.

Extraction of the green coffee can either be by batch, semi-continuous or continuous operation. Important parameters are the desired decaffeination level, the quantity of solvent employed, and the temperature of the solvent. According to this invention, the solvent employed is either diethyl succinate or a caffeine-deficient water solution of green coffee solubles, commonly referred to as "lean green extract," which solution has been decaffeinated by means of diethyl succinate. Extraction is accomplished by contacting the green coffee with the solvent for a period of time sufficient to remove the desired amount of caffeine. During extraction, temperatures should be maintained at low levels, and the time of extraction maintained as short as possible to reduce flavor changes in the green beans and, of course, to reduce processing costs. It is preferred to maintain the extraction solvent at a temperature from 0° C. to 100° C. The ratio of solvent-to-bean employed during extraction is selected to insure rapid caffeine removal while maintaining the amount of solvent to be stripped of caffeine, water and non-caffeine solids at an economical level.

After the desired degree of decaffeination is achieved, the green coffee is separated from the solvent, and, in the case of direct-solvent extraction, stripped of residual diethyl succinate. The beans may then be dried by any conventional means to prevent degradation during subsequent storage. The particular drying step employed should be such to minimize the heat effect on the decaffeinated moist green coffee.

In addition to the basic steps employed during extraction, the caffeine contained in the diethyl succinate is usually separated from the solvent by conventional techniques, such as evaporation and/or liquid-liquid extraction and crystallization. Usually the recovered solvent will be recycled to again extract caffeine and the separated caffeine may be further purified. A suitable process would be to initially evaporate most of the solvent, to then add water and evaporate residual solvent. Caffeine may then by crystallized from the water solution.

The preferred method of practicing this invention includes a semi-continuous water decaffeination system such as described in Berry et al. U.S. Pat. No. 2,309,092 patented Jan. 26, 1943. Caffeine is extracted with an aqueous extraction liquid from green coffee contained in a battery of extraction columns connected in series. At steady-state operation, the extraction columns contain green coffee of varying degrees of extraction and the process is countercurrent in operation.

During operation, the "lean green" extraction liquid is fed to the extraction column containing the most extracted green coffee, is passed through the coffee extracting caffeine therefrom, and then is passed out of the column into the extraction column containing the next most extracted green coffee in the battery. In this manner, the extraction liquid passes through green coffee of increasing freshness, thereby increasing in caffeine content, and is drawn-off from the extraction column containing the least extracted coffee in the battery for this cycle (one cycle being the period between successive draw-offs of extraction liquid from the fresh column). The "rich green" extraction liquid is then processed to remove caffeine in accordance with this invention.

As taught by Berry et al., in beginning a new cycle, the most extracted green coffee in the previous cycle is discharged from the extraction column and is in the desired final decaffeinated form. This coffee is then further processed into roasted and ground coffee or soluble coffee according to methods well-known in the art. The "lean green" extraction liquid is then fed to the column containing the most extracted green coffee for this cycle, this coffee being the next most extracted coffee from the previous cycle, and the extraction process continues with the caffeine-ladden, "rich green" extraction liquid being drawn off after contacting the freshest green coffee which is generally previously unextracted green coffee. Cycles are continued in this manner such that in each succeeding cycle a given column of green coffee becomes progressively more extracted and hence more deficient in caffeine.

In Berry et al., the aqueous extraction liquid fed to the first extraction column in the battery containing the most extracted green coffee, is a water solution of green coffee solubles other than caffeine. In this manner, a continuous dynamic equilibrium is substantially maintained between the solids (other than caffeine) in the green coffee and the solids in the extraction liquid. This equilibrium inhibits the net loss of green coffee solubles from the coffee to the surrounding water and, hence, the final decaffeinated green coffee is found to contain nearly the normal amount of solubles other than caffeine.

Of course, as the extraction liquid passes through the battery of extraction columns, it will become progressively more caffeine-laden. While many varying concentrations of these green coffee solubles in the extraction liquid may be employed, the concentrations and other operating factors are generally chosen so as to achieve, as nearly as possible, the dynamic equilibrium previously referred to.

The equilibrium between the soluble solids in the green coffee and the soluble solids in the extraction liquid works to minimize any concentration gradients of these materials and thereby hinders net mass transfer from the coffee to the surrounding liquid. Since caffeine is not initially present in the extraction liquid, a suitable gradient is present to effect extraction of the caffeine from the green coffee into the extraction liquid. In actuality, the dynamic equilibrium is more aptly described as equal rates of mass transfer. Thus while the net ideal result is to substantially prevent a reduction of the original amount of solubles other than caffeine in the green coffee, such prevention is the result of a combination of preventing natural solubles loss from the green coffee coupled with replacement of solubles from the extraction liquid at a rate equal to the rate of solubles lost from the green coffee.

In the Berry et al. patent, the aqueous extraction liquid drawn off from the extraction column containing the least extracted green coffee (i.e. "rich green extract") contains caffeine and green solubles which were either present in the original feed liquid or extracted from the green coffee. The extraction liquid is stripped of caffeine by means of a solvent, and the caffeine-containing solvent is removed from the aqueous extract. The essentially caffeinefree ("lean green") aqueous extract may then be recycled, usually with the addition of water, and after steam stripping to the battery of extraction columns.

According to this invention, the rich green extract is decaffeinated by means of diethyl succinate. Preferably direct contact between rich green extract and diethyl succinate in a liquid-liquid extractor, such as a rotating disk contactor, is employed; however, indirect contact methods such as ultrafiltration or dialysis may likewise be employed.

EXAMPLE

Rich green extract containing about 30% by weight green coffee solids was obtained from a commercial, countercurrent, multi-stage water decaffeination system as set forth in Berry et al. U.S. Pat. No. 2,309,092. 900 ml. of this extract was placed in a 2,000 ml. Erlenmeyer flask together with 900 ml. of diethyl succinate. The flask was clamped in a wrist shaker and shaken for a period of 50 minutes while the flask was submerged in a hot (195° F.) water bath. Thereafter, the diethyl succinate was decanted from the green extract. Following the above procedure, nine additional extractions of the 900 ml. sample of green extract were carried out with each extraction employing 900 ml. of fresh diethyl succinate. Caffeine analysis of the green extract showed the following results for the reduction of the weight percent of caffeine by weight of the green extract:

|  | % Caffeine |
|---|---|
| Rich Extract (Control) | 1.04 |
| After 1st. Extraction | 0.73 |
| After 5th. Extraction | 0.14 |
| After 10th. Extraction | 0.07 |

After the tenth extraction, the green extract was cooled to 40° F. and centrifuged to remove any dispersed diethyl succinate. Residual diethyl succinate was then steam-stripped from the green extract in a one step steam injection vacuum apparatus initially containing 1950 ml. of green extract and utilizing 26 pounds of steam and a stripping time of 12.5 hours. Analysis of the green extract found a diethyl succinate residue level of less than 5 ppm.

The decaffeinated green extract was adjusted to a 20% solids concentration, and used for the decaffeination of 800 grams of green Colombian beans in a 2 liter Parr bomb under the following conditions: pass time of one hour, temperature of 170°–180° F, eight total processes, and 800 ml. of fresh lean green extract per pass. After extraction, the green extract residue was removed from the beans in a basket centrifuge and the beans were dried to 10% moisture in a fluidized bed dryer at 150° F for 2 hours. The decaffeinated beans which were found to contain 0.113% by weight of caffeine, were roasted in a one pound Probat roaster to a medium roast color and then brewed to produce a coffee beverage which was judged to exhibit no flavor difference from a beverage brewed from beans (containing 0.051% by weight caffeine) comparably roasted and decaffeinated with a 20% solids green extract which had been decaffeinated by direct contact with trichloroethylene in a commercial scale liquid-liquid extraction column (Rotary Disk Contactor).

Having thus described the invention, what is claimed is:

1. A method for decaffeinating green coffee comprising the steps of:
   a. moistening the green coffee,
   b. contacting the moistened green coffee with diethyl succinate for a sufficient period of time to remove caffeine from the coffee,
   c. removing residual diethyl succinate from the green coffee, and
   d. roasting the decaffeinated green coffee.

2. A method for decaffeinating green coffee comprising the steps of:
   a. contacting the green coffee with a decaffeinated aqueous extract of green coffee, contact between the green coffee and the decaffeinated aqueous extract being maintained for a sufficient time to remove caffeine from the green coffee, thereafter
   b. separating the green coffee from the aqueous extract, and then
   c. roasting the decaffeinated green coffee and
   d. decaffeinating the caffeine-containing aqueous extract of step b) by means of diethyl succinate, and thereafter
   e. recycling the decaffeinated aqueous extract of step d) to again contact caffeine-containing green coffee.

* * * * *